(12) United States Patent
Oberle et al.

(10) Patent No.: US 8,052,561 B2
(45) Date of Patent: Nov. 8, 2011

(54) METHOD FOR OPTIMIZING PLATES OF A PLATE LINK CHAIN, AND PLATE FOR A PLATE LINK CHAIN

(75) Inventors: Wolfgang Oberle, Seelbach (DE); André Teubert, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 974 days.

(21) Appl. No.: 10/510,141

(22) PCT Filed: Apr. 10, 2003

(86) PCT No.: PCT/DE03/01189
§ 371 (c)(1),
(2), (4) Date: May 31, 2005

(87) PCT Pub. No.: WO03/087621
PCT Pub. Date: Oct. 23, 2003

(65) Prior Publication Data
US 2005/0209035 A1  Sep. 22, 2005

(30) Foreign Application Priority Data

Apr. 10, 2002 (DE) .................................. 102 15 715
Nov. 21, 2002 (DE) .................................. 102 54 351

(51) Int. Cl.
*F16G 1/24* (2006.01)
(52) U.S. Cl. ................ 474/245; 474/215; 59/4
(58) Field of Classification Search ............... 474/202, 474/206, 212–215, 237, 244, 245; 59/4, 59/5, 6, 8, 13, 29
See application file for complete search history.

(56) References Cited

U.S. PATENT DOCUMENTS

| | | | | |
|---|---|---|---|---|
| 4,642,079 A * | 2/1987 | Horowitz et al. | ............. | 474/219 |
| 4,898,568 A | 2/1990 | Sakakibara et al. | .......... | 474/245 |
| 4,909,778 A * | 3/1990 | Schonnenbeck | ............. | 474/245 |
| 5,026,331 A | 6/1991 | Sugimoto et al. | ............. | 474/214 |
| 5,372,554 A | 12/1994 | Okuda | ............. | 474/206 |
| 5,427,583 A * | 6/1995 | Wolf | ............. | 474/206 |
| 6,135,908 A * | 10/2000 | Greiter | ............. | 474/215 |
| 6,406,396 B1 * | 6/2002 | Turner | ............. | 474/242 |
| 6,443,625 B1 | 9/2002 | Nogi | ............. | 384/572 |
| 6,478,704 B1 * | 11/2002 | Greiter | ............. | 474/229 |
| 6,695,731 B2 * | 2/2004 | Linnenbrugger et al. | .... | 474/215 |
| 2001/0046917 A1 * | 11/2001 | Linnenbrugger et al. | .... | 474/215 |

FOREIGN PATENT DOCUMENTS

| | | |
|---|---|---|
| EP | 0 741 255 A1 | 11/1996 |
| JP | 1-176832 A | 7/1989 |
| JP | 3-000350 A | 1/1991 |
| JP | 6-207643 A | 7/1994 |
| WO | WO 00/26551 | 11/2000 |

* cited by examiner

*Primary Examiner* — Bradley King
*Assistant Examiner* — Thomas Irvin
(74) *Attorney, Agent, or Firm* — Alfred J. Mangels

(57) ABSTRACT

A method for optimizing the link plates of a plate-link chain drive chain for use in a variable speed unit of a belt-driven conical-pulley transmission. The chain includes plate links formed from pairs of plates that have openings through which pairs of rocker members extend. The plates include longitudinally-extending legs that extend in the chain movement direction and vertical legs that extend perpendicular to the chain movement direction. The method is directed to minimizing bending stresses in the longitudinal and vertical legs of the plates as the chain passes around a pulley, and as the rocker members and the chain tension impose forces on the plates. The stress minimization results in minimal material usage and minimal weight of the chain.

4 Claims, 3 Drawing Sheets

METHOD FOR OPTIMIZING PLATES OF A PLATE LINK CHAIN, AND PLATE FOR A PLATE LINK CHAIN

BACKGROUND OF THE INVENTION

1. Field of the Invention

The present invention relates to a method for optimizing link plates in a plate-link chain for use in a variable speed unit of a belt-driven conical-pulley transmission. The invention furthermore relates to a link plate configuration for such a plate-link chain.

2. Description of the Related Art

Belt-driven conical-pulley transmissions with continuously variable transmission ratios are used increasingly in modern motor vehicles, not only because of the driving comfort that can be achieved with them, but also for possible fuel consumption savings.

One component that is decisive for the durability and the torque transmission ability of the variable speed unit of such a belt-driven conical-pulley transmission is the endless torque-transmitting means itself, which can be designed as a plate-link chain, for example, as illustrated diagrammatically in FIG. 5 in a small section. Such a plate-link chain is composed of plate-links 10, which are connected with each other by means of rocker members 12. The plate-links 10 are arranged behind one another in several rows that extend in the direction of movement of the plate-link chain and that are arranged adjacent to each other. In FIG. 5 the plate $10_1$ is part of the front row in the viewing direction, the plate $10_2$ is part of a row adjacent to the front row, and plate $10_3$ is part of another row. To connect the plates, rocker members 12 are provided, which extend through the respective plate openings 14 transversely to the direction of chain movement. In doing so, two rocker member pairs $16_1$ and $16_2$ extend through each plate opening, wherein the rocker members $12_1$ and $12_2$ are part of the rocker member pair $16_1$ and the rocker members $12_3$ and $12_4$ are part of the rocker member pair $16_2$. As can be seen, the exterior sides of the rocker members $12_1$ and $12_4$, which face away from each other, of the rocker member pairs $16_1$ or $16_2$ are supported on the inner surface of the plate opening 14, either on the front or the rear inner surface in relation to the direction of movement of the plate-link chain. The rocker members $12_2$ and $12_3$ that face each other are supported on the inner surfaces of plate openings of plates arranged in adjacent rows. The surfaces of the rocker members of each rocker member pair facing each other form rolling surfaces, on which the rocker members roll against each other when the radius R, at which the respective region of the plate-link chain is curved, changes.

Such a plate-link chain, as well as the corresponding variable speed unit with two conical disk pairs, around which the plate-link chain runs, are known as such and will therefore not be described in detail.

FIG. 6 shows a plate 10 and a rocker member 12 in an enlarged scale.

The plate 10 has two longitudinal legs 18 and two vertical legs 20, which jointly enclose the plate opening 14. According to FIG. 6, the rocker member 12, the rolling surface of which has been designated with the reference number 21, lies with its right side against the inner surface of the plate opening 14, wherein the contact surfaces have been adjusted with each other such that contact only occurs in the region of the transition between the longitudinal legs 18 to the vertical legs 20, and that in the region of the center of the vertical leg 20 no contact occurs between rocker member 20 and opening 14 of plate 10. When the plate 10 according to FIG. 6 is moved from right to left, forces are transmitted at the contact regions through the force transmitted by the plate-link chain, as represented in the figures with the arrows F indicating the load centers of the force and the force directions. Due to the offset design of the application points of the force in relation to the center of the longitudinal legs, tensile as well as bending stresses act within the longitudinal legs 18. Likewise, bending and tensile stresses act within the vertical legs 20.

Naturally, with given materials and given geometrical boundary conditions of the respective variable speed unit, i.e., its spacing, minimal and maximum revolution radius of the plate-link chain, etc., as well as the torque to be transmitted, the dimensions required for a plate depend upon the stresses that are active within the plate.

An object of the present invention is to design plates such that with given boundary conditions the plate is optimized with the goal of minimal material usage and hence minimal weight.

SUMMARY OF THE INVENTION

A first solution to achieve that object is achieved with a method for optimizing the plates of a plate-link chain for use in a variable speed unit of a belt-driven conical-pulley transmission. The plate-link chain includes plate links arranged behind one another in several rows that are arranged next to one another transversely in relation to the direction of movement of the plate-link chain. The plate links overlap transversely in relation to the direction of chain movement and are connected by means of rocker members that extend transversely in relation to the direction of movement of the chain. An opening of each plate is penetrated by two rocker member pairs, wherein the rocker members of the rocker member pairs that face away from each other rest against the front or rear inside inner surfaces of the plate opening. The rocker members facing each other rest against the front or rear inner surfaces of plate openings of adjacent plates. The surfaces of the rocker members that face each other of each rocker member pair roll against each other when the plate-link chain bends. As a result of the chain bending, the transmission of force from the rocker members into the plates occurs such that the bending stress acting within the longitudinal legs that extend in the direction of chain movement, and the bending stress acting within the vertical legs that extend perpendicular to the direction of movement of the plates resulting from the force transmission is minimized for given boundary conditions.

An advantageous embodiment of the method in accordance with the invention involves minimizing the bending moment MB of the longitudinal legs of the plates of the plate-link chain in accordance with the following formula for given boundary conditions:

$$MB = \frac{F * He}{k+1} \cdot \left[1 - \frac{He}{L2}\right] \text{ with } k = \frac{I2 * L1}{I1 * L2}, \text{ wherein}$$

$F$ = applied force $He$ = lever arm of the applied force $F$ $I1$ = planar moment of inertia of the longitudinal leg (= leg height$^3$ * thickness/12)

$I2$ = planar moment of inertia of the vertical leg (= leg width$^3$ * thickness/12)

-continued

L1 = overall length of the longitudinal leg

L2 = overall length of the vertical leg.

The bending moment MA of the vertical legs is minimized for the plate-link chain in accordance with the following formula for given boundary conditions:

$$MB = \frac{F * He}{k+1} \cdot \left[1 - \frac{He}{L2}\right] \text{ with } k = \frac{I2 * L1}{I1 * L2}, \text{ wherein}$$

F = applied force

He = lever arm of the applied force F

I1 = planar moment of inertia of the longitudinal leg (= leg height$^3$ * thickness/12)

I2 = planar moment of inertia of the vertical leg (= leg width$^3$ * thickness/12)

L1 = overall length of the longitudinal leg

L2 = overall length of the vertical leg.

Another solution to the object of the invention is achieved with a plate for a plate-link chain for use in a variable speed unit of a belt-driven conical pulley transmission. The plate-link chain includes plate links arranged behind one another in several rows that are arranged next to another transversely in relation to the direction of movement of the plate-link chain. The plate links overlap transversely in relation to the direction of chain movement and are connected by means of rocker members that extend transversely in relation to the direction of movement of the chain. An opening of each plate is penetrated by two rocker member pairs, wherein surfaces of the rocker members of the rocker member pairs that face away from each other rest against the front or rear inner surfaces of the plate opening. The surfaces of the rocker members of the rocker member pairs that face each other rest against the front or rear inner surfaces of plate openings of adjacent plates The surfaces of the rocker members of each rocker member pair that face each other roll against each other when the plate-link chain bends. The plate is dimensioned such that the bending stress acting within the longitudinal legs that extend in the direction of chain movement, or the bending stress acting within the vertical legs that extend perpendicular to the direction of movement of the plate-link chain due to the transmission of force from the rocker members, is minimal under given boundary conditions.

In an advantageous embodiment of the plate in accordance with the present invention, the bending moment MB of the longitudinal legs is minimal for the plate-link chain in accordance with the following formula for given boundary conditions:

$$MB = \frac{F * He}{k+1} \cdot \left[1 - \frac{He}{L2}\right] \text{ with } k = \frac{I2 * L1}{I1 * L2}, \text{ wherein}$$

F = applied force

He = lever arm of the applied force F

I1 = planar moment of inertia of the longitudinal leg (= leg height$^3$ * thickness/12)

I2 = planar moment of inertia of the vertical leg (= leg width$^3$ * thickness/12)

L1 = overall length of the longitudinal leg

L2 = overall length of the vertical leg.

In another embodiment, the bending moment MA of the vertical leg is minimal for the plate-link chain corresponding to the following formula for given boundary conditions:

$$MB = \frac{F * He}{k+1} \cdot \left[1 - \frac{He}{L2}\right] \text{ with } k = \frac{I2 * L1}{I1 * L2}, \text{ wherein}$$

F = applied force

He = lever arm of the applied force F

I1 = planar moment of inertia of the longitudinal leg (= leg height$^3$ * thickness/12)

I2 = planar moment of inertia of the vertical leg (= leg width$^3$ * thickness/12)

L1 = overall length of the longitudinal leg

L2 = overall length of the vertical leg.

The value for k advantageously ranges from 1 to 3.5.

BRIEF DESCRIPTION OF THE DRAWINGS

The invention will be explained below based on diagrammatic drawings for example and with additional details.

There is shown.

DESCRIPTION OF THE PREFERRED EMBODIMENTS

Figure 1:
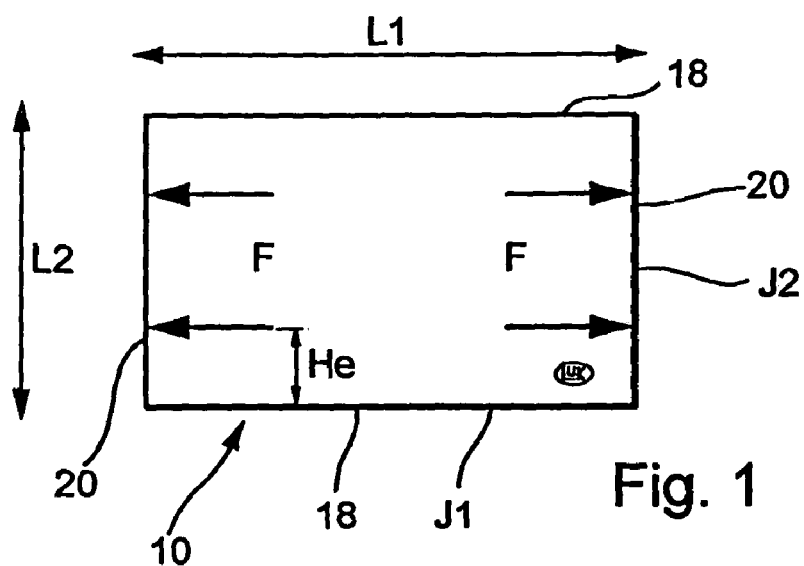
FIG. 1 a simplified representation of a plate in a side view.
Figure 6:
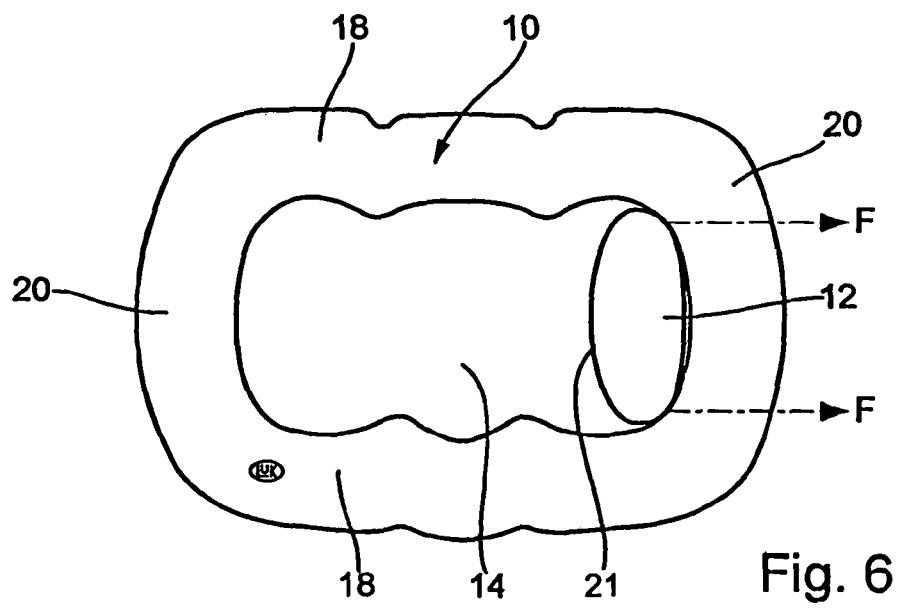

FIG. 1 is a simplified diagrammatic representation of the plate 10 of FIG. 6, which is represented as a rectangle that includes the longitudinal legs 18 and the vertical legs 20. L1 designates the overall length of a longitudinal leg or of the longitudinal length of the plate. L2 designates the overall length of a vertical leg 20 or of the vertical height of the plate. The arrows F illustrate, as shown in FIG. 6, the forces acting on the plate 10. He designates the distance of the line of action of the force F that is adjacent to a longitudinal leg, or the length of the lever arm of the force F in the direction of the longitudinal legs. J1 designates the planar moment of inertia of the longitudinal leg, i.e., SH$^3$*D/12, wherein SH is the height of the longitudinal leg (see FIG. 4). The planar moment of inertia J2 of the vertical leg is SB$^3$*D/12, wherein SB is the width of the vertical leg (FIG. 4) and D the thickness of the plate.

Figure 2:
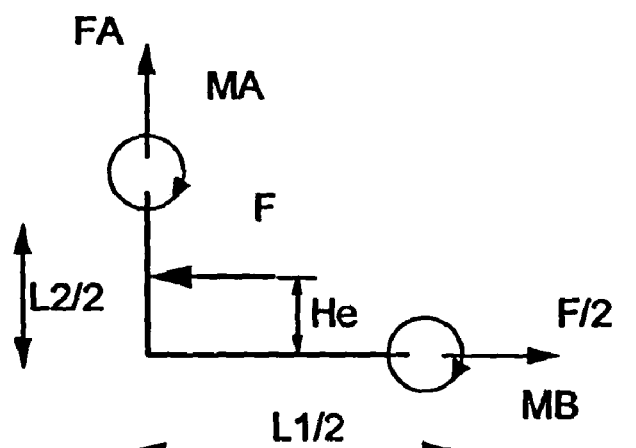
FIG. 2 a portion of the representation of FIG. 1 to explain sectional forces and moments, FIG. 3 a portion of FIG. 1 to explain the course of the bending moments, FIG. 4 a side view of a half of a conventional plate and an optimized plate, FIG. 5 a portion of a plate-link chain as it revolves at a radius R, and FIG. 6 a side view of a known plate with a rocker member arranged therein.

FIG. 2 illustrates the observed sectional forces and moments, wherein FA represents the force active in the vertical leg and extending in the direction of the vertical leg. MA represents the bending moment of the vertical leg, which is caused by the force F transmitted to the plate and active in the longitudinal direction of the plate-link chain, MB is the bending moment of the longitudinal leg caused by the force F. F obviously designates the total force transmitted to a plate, of which each longitudinal leg receives one-half.

Figure 3:
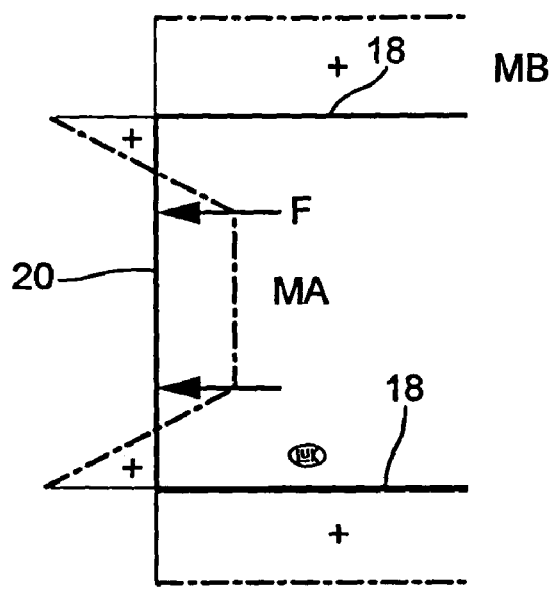

FIG. 3 shows the bending moments MA and MB that act on a vertical leg 20 and on the longitudinal legs 18 as a consequence of the force.

An analysis and calculation in which the bending moment progression is determined initially in sections and then in which the overall bending moment is determined is based upon the view shown in FIG. 3. The bending moment MA in the vertical leg 20 is initially constant beginning from its center outward and is directed inward (−), then it decreases to zero and is directed outward (+). The bending moment MB is constant along the entire longitudinal leg 18 and is directed outward. The magnitude of the bending moment MB in the longitudinal legs is as follows:

$$MB = \frac{F*He}{k+1} \cdot \left[1 - \frac{He}{L2}\right] \text{ with } k = \frac{I2*L1}{I1*L2}, \text{ wherein}$$

The magnitude of the bending moment MA in the vertical legs is as follows:

$$MA = F*He - MB$$

$$MB = \frac{F*He}{k+1} \cdot \left[1 - \frac{He}{L2}\right] \text{ and } k = \frac{I2*L1}{I1*L2}$$

$$MA = F*He * \left[1 - \frac{1}{k+1} \cdot \left(1 - \frac{He}{L2}\right)-\right]$$

Overall, the following dependencies and influences can be determined:

The bending moment MB in the longitudinal legs is constant along their entire length L1. The influence of the lever arm He on the bending moment MB is nearly linear. When the ratio of the length of the longitudinal leg L1 to the length of the vertical leg L2 increases, the bending moment MB decreases. When the I2/I1 ratio increases, the bending moment MB decreases as well. The stiffer the vertical leg is compared to the longitudinal leg, the less bending moment is transmitted into the longitudinal leg. A decrease in the height SH of the longitudinal leg causes a relatively small increase in the maximum stress within the longitudinal leg (stress in its outer region). Additionally, that reduces the portion of the bending stress in the maximum stress. In the range from 40% to 70% of the height of the longitudinal leg, the maximum stress remains nearly constant. The analytical observations furthermore show that the bending stress in the longitudinal leg decreases with increasing length L1 of the plate in relation to the height L2 of the plate.

Analogous dependencies apply for the bending moment MA.

When considering the respective boundary conditions, such as available design, spacing of the plate-link chain, force to be transmitted etc., the above formulas enable a minimization of the bending stress, or of the bending moment MB acting on the longitudinal legs 18 or of the bending moment MA acting on the vertical legs 20, thus allowing the required material and hence the weight to be lowered for a given force F that is to be transmitted. In order to minimize MB or MA based on the above formulas, various mathematical methods can be employed, wherein at least one of the variables is modified and its influence on MB or on MA can be examined until MB or MA overall becomes minimal under the given boundary conditions.

Of course only MA or only MB can be minimized, whereby it is advantageous to minimize the two in a mutually adjusted fashion.

Figure 4:
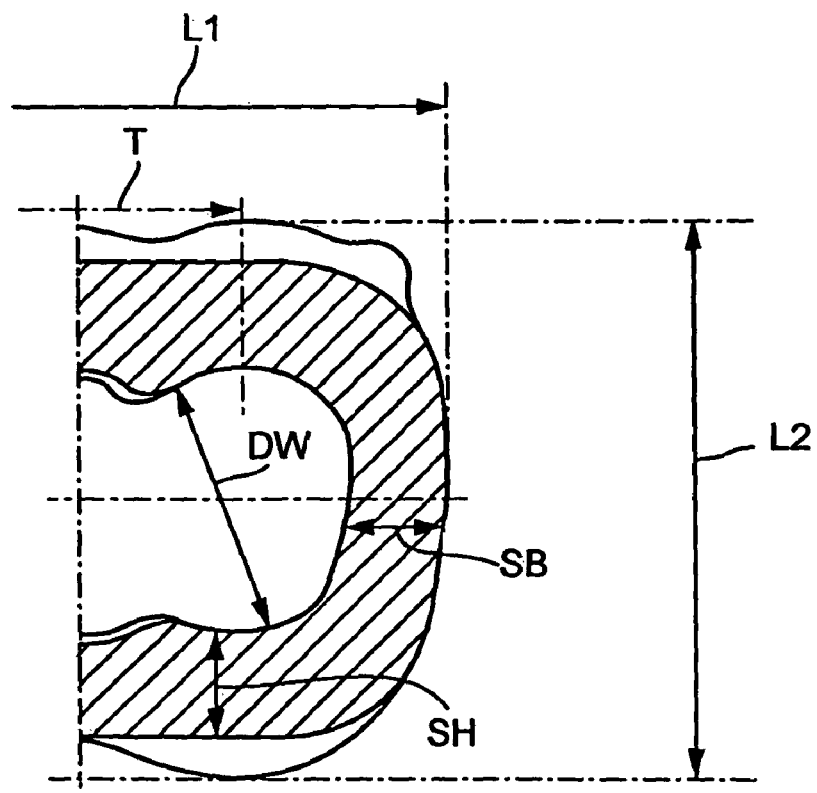
Figure 5:
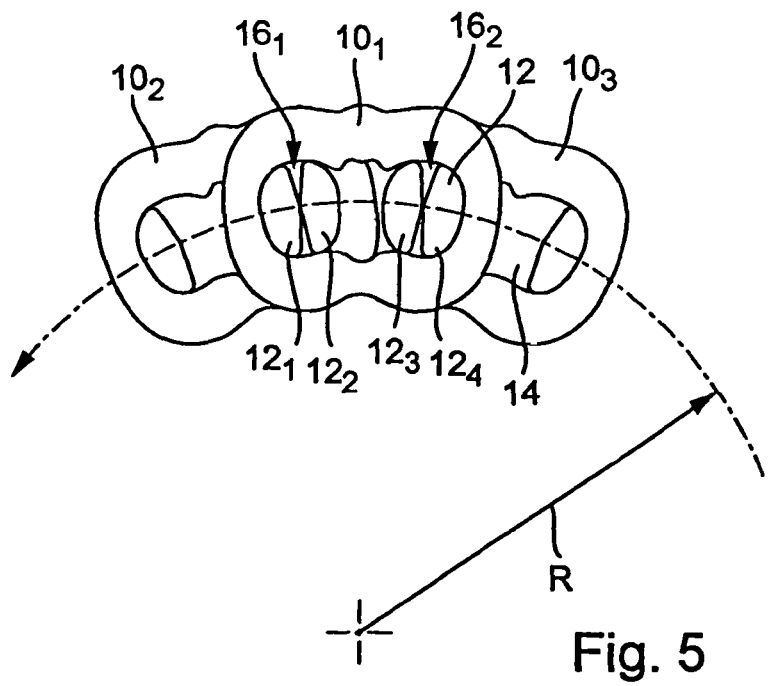

FIG. 4 shows the result of an optimization, in which the distance T (the distance between the rocker surfaces of adjacent rocker member pairs), the length L1, the thickness of the rocker member and the force to be transmitted have been kept constant. DW indicates the effective diameter of a bearing formed by a rocker member pair. The innermost contour line and the outermost contour line show the starting contour of a rocker member. The hatched region shows the contour of an optimized rocker member. As is evident, the height of the longitudinal leg was clearly reduced without negatively influencing the force transmission ability of the rocker member.

The material savings evident from FIG. 4 have the additional advantage that the plate-link chain is suited for higher rotational speeds, since centrifugal forces are reduced.

| Component | Meaningful Tendency for $k_{minimal}$ | 1.1 Advantageous Range of Values |
|---|---|---|
| $I1 = (BH1^3) * T/12$ | BH1 as small as possible | $2.4 < BH1 < 3.0$ |
| $I2 = (BB2^3) * T/12$ | BB2 as large as possible | $2.7 < BB2 < 3.0$ |
| L1 | L1 as large as possible | Maximum 20.5 mm |
| L2 | L2 as small as possible | $11.6 < L2 < 13$ |

The factor k advantageously lies between 1 and 3.5.

Because of the optimized bending stresses within the longitudinal and vertical legs in accordance with the invention, it is possible to accommodate in a small space plate-link chains with increased force and/or torque transmission capability, thus reducing the overall spatial requirement of the variable speed unit. That result is achieved above all with an optimized ratio between the dimensions of L1 and L2 and the moments of inertia I1 and I2.

The patent claims submitted with the application are formulation proposals without prejudice for achieving farther-reaching patent protection. The applicant reserves the right to claim additional feature combinations that have so far only been disclosed in the description and/or drawings.

References used in the dependent claims point to the further development of the object of the main claim by features of the respective dependent claims. They should not be interpreted as a waiver for obtaining independent, object-related protection for the feature combinations of the referenced dependent claims.

Since the objects of the dependent claims with respect to the state of the art can form their own and independent inventions as of the priority date, the applicant reserves the right to make them the object of independent claims or declarations of division. They can furthermore also turn into independent inventions, having a form that is independent from the objects of the preceding dependent claims.

The embodiments should not be interpreted as a limitation of the invention. Rather, within the framework of the present disclosure, numerous changes and modifications are possible, especially such variations, elements, and combinations and/or materials that are obvious to those skilled in the art with respect to the solution of the task at hand, for example by combining or modifying individual features and/or elements or procedural steps described in connection with the general description and embodiments, as well as those contained in the drawings and that lead to a novel object or new procedural steps or procedural step sequences through features that can be combined, also to the extent that they relate to manufacturing, testing, and operating methods.

What is claimed is:

1. A method for optimizing plate geometry of a plate of a plate link chain for use in a variable speed drive unit of a belt-driven conical-pulley transmission, said method comprising the steps of:

defining for a chain a predetermined applied longitudinal force to be transmitted by the chain and a predetermined applied longitudinal force lever arm;

providing an initial plate geometry for a plate that includes an opening for receiving pairs of rocker members that bear against sides of the opening, wherein the opening is bounded by spaced longitudinal legs that extend in a chain movement direction and spaced vertical legs that extend in a direction perpendicular to the chain movement direction, wherein the initial plate geometry includes an initial longitudinal leg length and longitudinal leg width, an initial vertical leg length and vertical leg width, and an initial plate thickness;

determining a bending moment (MB) acting on the longitudinal legs of the plate when the plate is subjected to a predetermined applied longitudinal force that is applied at a predetermined lever arm distance relative to the longitudinal leg from the following bending moment relationship based upon the following plate geometry variables:

$$MB = \frac{F * He}{k+1} \cdot \left[1 - \frac{He}{L2}\right] \text{ with } k = \frac{I2 * L1}{I1 * L2}, \text{ wherein}$$

$F$ = applied longitudinal force $He$ = lever arm of the applied force $F$ $I1$ = planar moment of inertia of the longitudinal leg (= leg height$^3$ * leg thickness/12)

$I2$ = planar moment of inertia of the vertical leg (= leg width$^3$ * leg thickness/12)

$L1$ = overall length of the longitudinal leg $L2$ = overall length of the vertical leg.

modifying respective ones of the plate geometry variables; and calculating longitudinal leg bending moments for different plate longitudinal leg lengths and different longitudinal leg planar moments of inertia at the predetermined applied longitudinal force and the predetermined applied longitudinal force lever arm until a minimum longitudinal leg bending moment is achieved to thereby provide a plate of minimum longitudinal leg material usage and minimum longitudinal leg weight for the predetermined longitudinal force that is applied to the plate opening at the predetermined lever arm distance relative to the longitudinal leg.

2. A method in accordance with claim 1, wherein $1 \leq k \leq 3.5$.

3. A method for optimizing plate geometry of a plate of a plate link chain for use in a variable speed drive unit of a belt-driven conical-pulley transmission, said method comprising the steps of:

defining for a chain a predetermined applied longitudinal force to be transmitted by the chain and a predetermined applied longitudinal force lever arm;

providing an initial plate geometry for a plate that includes an opening for receiving pairs of rocker members that bear against sides of the opening, wherein the opening is bounded by spaced longitudinal legs that extend in a chain movement direction and spaced vertical legs that extend in a direction perpendicular to the chain movement direction, wherein the initial plate geometry includes an initial longitudinal leg length and longitudinal leg width, an initial vertical leg length and vertical leg width, and an initial plate thickness;

determining a bending moment (MA) acting on the vertical legs of the plate when the plate is subjected to a predetermined applied longitudinal force that is applied at a predetermined lever arm distance relative to the longitudinal legs from the following bending moment relationship based upon the following plate geometry variables:

$$MB = \frac{F * He}{k+1} \cdot \left[1 - \frac{He}{L2}\right] \text{ with } k = \frac{I2 * L1}{I1 * L2}, \text{ wherein}$$

$F$ = applied longitudinal force $He$ = lever arm of the applied force $F$ $I1$ = planar moment of inertia of the longitudinal leg (= leg height$^3$ * leg thickness/12)

$I2$ = planar moment of inertia of the vertical leg (= leg width$^3$ * leg thickness/12)

$L1$ = overall length of the longitudinal leg $L2$ = overall length of the vertical leg;

modifying respective ones of the plate geometry variables; and calculating vertical leg bending moments for different plate vertical leg lengths and different vertical leg planar moments of inertia at the predetermined applied force and the predetermined applied force lever arm until a minimum vertical leg bending moment is achieved to thereby provide a plate of minimum vertical leg material usage and minimum vertical leg weight for the predetermined longitudinal force that is applied to the plate opening at the predetermined lever arm distance relative to the longitudinal leg.

4. A method in accordance with claim 3, wherein $1 \leq k \leq 3.5$.

* * * * *